(12) United States Patent
Mesnard (10) Patent No.: US 11,486,523 B2
(45) Date of Patent: Nov. 1, 2022

(54) CLAMPING SYSTEM FOR CONNECTING PIPES, COMPRISING A COLLAR AND A WASHER CARRYING SUPPORT LUGS

(71) Applicant: CAILLAU, Issy-les-Moulineaux (FR)

(72) Inventor: Eric Mesnard, Tours en Sologne (FR)

( * ) Notice: Subject to any disclaimer, the term of this patent is extended or adjusted under 35 U.S.C. 154(b) by 64 days.

(21) Appl. No.: 17/221,020

(22) Filed: Apr. 2, 2021

(65) Prior Publication Data
US 2021/0310592 A1 Oct. 7, 2021

(30) Foreign Application Priority Data

Apr. 3, 2020 (FR) ..................................... 20 03382
May 19, 2020 (FR) ..................................... 20 05095

(51) Int. Cl.
*F16L 23/08* (2006.01)
*F16L 23/00* (2006.01)

(52) U.S. Cl.
CPC ............. *F16L 23/003* (2013.01); *F16L 23/08* (2013.01)

(58) Field of Classification Search
CPC ....... F16L 23/003; F16L 23/006; F16L 23/04; F16L 23/08; F16L 23/16; F16L 23/162; F16L 21/065
USPC ........................................................ 285/410
See application file for complete search history.

(56) References Cited

U.S. PATENT DOCUMENTS

| | | | |
|---|---|---|---|
| 4,185,858 A | 1/1980 | Peash | |
| 7,399,005 B2 * | 7/2008 | Rigollet | F16L 23/08 |
| | | | 285/410 |
| 9,016,731 B2 * | 4/2015 | Rigollet | F16L 23/003 |
| | | | 285/334.5 |
| 10,612,705 B2 * | 4/2020 | Prevot | F16L 23/08 |
| 10,634,270 B2 * | 4/2020 | Rigollet | F16L 23/08 |
| 2005/0017510 A1 * | 1/2005 | Rigollet | F16L 23/20 |
| | | | 285/367 |
| 2013/0207389 A1 * | 8/2013 | Rigollet | F16L 23/08 |
| | | | 285/407 |
| 2017/0254454 A1 * | 9/2017 | Vosgeois | F16L 23/08 |
| 2017/0292643 A1 * | 10/2017 | Prevot | F16L 23/08 |

(Continued)

FOREIGN PATENT DOCUMENTS

| | | |
|---|---|---|
| EP | 1451498 A1 | 9/2004 |
| EP | 2598785 A1 | 6/2013 |

(Continued)

OTHER PUBLICATIONS

English language abstract of FR3057918.

*Primary Examiner* — Aaron M Dunwoody
(74) *Attorney, Agent, or Firm* — Robert Facey (57) ABSTRACT

The clamping system is used for connecting two pipes whose facing ends have protruding bearing surfaces. The clamping system comprises a collar that can be clamped and a washer. The collar includes a belt whose internal periphery delimits a recess into which the bearing surfaces can be inserted. The washer comprises an annular part disposed inside the belt and carrying support lugs which have a hook configured to hook on an edge of the belt and a link section which extends between the annular part and the hook. The link section carries at least one retaining wing bent radially outwardly and having a retaining edge, the retaining wing having a width, measured axially, which decreases towards its free end, the edge of the belt being housed in the space formed between the retaining edge and the hook.

16 Claims, 8 Drawing Sheets

(56) References Cited

U.S. PATENT DOCUMENTS

| | | | | |
|---|---|---|---|---|
| 2018/0094755 | A1* | 4/2018 | Rigollet | F16L 23/162 |
| 2019/0093803 | A1* | 3/2019 | Wu | F16L 23/18 |
| 2019/0331270 | A1* | 10/2019 | Drivon | F16L 23/003 |
| 2020/0141525 | A1* | 5/2020 | Drivon | F16L 23/003 |
| 2021/0071563 | A1 | 3/2021 | Tangermann et al. | |
| 2021/0148498 | A1* | 5/2021 | Jacquelin | F16L 23/08 |
| 2021/0239245 | A1* | 8/2021 | Cottle | F16L 23/08 |
| 2021/0356060 | A1* | 11/2021 | Prevot | F16L 23/003 |
| 2022/0042629 | A1* | 2/2022 | Kashyap | F16B 7/22 |

FOREIGN PATENT DOCUMENTS

| | | |
|---|---|---|
| EP | 3232107 A1 | 10/2017 |
| EP | 3306164 A1 | 4/2018 |
| FR | 3057918 A1 | 4/2018 |
| WO | 03/002306 A2 | 1/2003 |
| WO | 2019/115390 A1 | 6/2019 |

* cited by examiner

CLAMPING SYSTEM FOR CONNECTING PIPES, COMPRISING A COLLAR AND A WASHER CARRYING SUPPORT LUGS

TECHNICAL FIELD

The disclosure relates to a clamping system for connecting a first and a second pipe whose facing ends have bearing surfaces protruding relative to the cylindrical external surface of said pipes, the system comprising a collar and a washer, the collar can be clamped around the bearing surfaces of the pipes.

BACKGROUND

Patents EP 1 451 498, EP 2 598 785 and EP 3 232 107 disclose clamping systems comprising a collar which has a belt able to be clamped by reducing its diameter and a washer pre-mounted in the collar. More specifically, this system comprises a washer which comprises a closed annular part forming a seal and lugs linking this seal to the collar. The washer is initially held relative to the belt of the collar so that an annular space is formed between the annular part of the washer and the inner periphery of the belt, so as to allow the engagement of the end of a pipe between the annular part of the washer and the belt. Then, the inner pipe is itself engaged so as to come into contact with the annular part of the washer. This device is particularly adapted for clamping two pipes fitted together and having radial protruding surfaces used as a bearing for a clamping collar which comprises a recess capable of housing these radially protruding surfaces, the annular part of the washer having itself a shape adapted to these protruding surfaces.

Particularly, the washer can be made from a metal of the stainless steel type, as well as the belt of the collar.

In the aforementioned patents, particularly EP 1 451 498 and EP 2 598 785, the washer is held in position relative to the collar in the unclamped state by means of lugs of different types. Some lugs are inner lugs, which are entirely contained inside the belt and have the form of tabs raised radially to bear on the inner periphery of one of the flanks of the belt and retain the washer with respect to an axial displacement relative to the collar in a first direction outwardly of this flank. Other lugs, longer than the inner lugs, are shaped as hooks whose heads protrude outside beyond the edge of this belt flank in order to hook thereon so as to retain the washer with respect to an axial displacement in the opposite direction. Thus, the lugs of these two types maintain the axial positioning of the washer relative to the collar before clamping the latter and ensure the presence of the aforementioned annular space. Still other lugs are used for the centering of the washer relative to the collar.

These systems are satisfactory but require relatively complex geometries and distinct manufacturing steps to equip the washer of the lugs with these different types.

SUMMARY

The disclosure aims at overcoming at least substantially the aforementioned drawbacks.

Thus, the disclosure concerns a clamping system for connecting a first and a second pipe whose facing ends have bearing surfaces protruding relative to the cylindrical external surface of said pipes, the system comprising a collar that can be clamped and a washer, the collar comprising a belt able to cooperate with said bearing surfaces by its internal periphery delimiting a recess into which the bearing surfaces can be inserted, the washer comprising an annular part disposed inside the belt and carrying support lugs which have a hook configured to hook on an edge of the belt and a link section which extends between the annular part and the hook, the link section carrying at least one retaining wing which is bent radially outwardly and which has a retaining edge spaced from the hook, the retaining wing having a width, measured axially, which decreases towards its free end, the edge of the belt being housed in the space formed between the retaining edge and the hook.

Thus, the same support lug allows, through its hook and the bent retaining wing, both retaining the washer relative to the collar in the two opposite axial directions and maintaining the annular space necessary for the engagement of the end of a pipe between the washer and the adjacent flank of the belt, to pre-mount the clamping system on this pipe. It therefore performs the function of double axial retention of the washer and the spacer function. According to the disclosure, the axial width of the retention wing decreases towards its free end. During the clamping of the collar, the support lug, for example the retaining wing, may deform to allow the effective clamping of the belt on the bearing surfaces. In the clamped state of the collar on the pipes, the radial space requirement of the support lug and, for example of the retaining wing, may be minimized. This deformation of the retaining wing decreases its radial height, for example by folding it radially inwardly, as if it were unfolding relative to the link section which carries it. Part of the force implemented for clamping the collar is consumed to cause the deformation of the retaining wing and is therefore not directly useful for the clamping force of the belt on the bearing surfaces. Providing the retaining wing with a small width at its free end makes it more sensitive to the radial deformation forces. In other words, thanks to its particular shape, the retaining wing begins to deform from a moderate force and, once this deformation has started, it continues as the clamping of the collar continues, without consuming a significant part of the clamping force. Thus, and although the retaining wing has at its base a sufficient width to enable it to withstand the axial deformations and perform its function of double axial retention of the washer and its spacer function, it deforms during the clamping of the collar without consuming a significant part of the force implemented for the clamping. The width of the retaining wing may not decrease continuously from its base, but at least in the region of its outer radial free end, the retaining wing has a width which decreases as it progresses radially outwardly, up to this free end. However, the width of the retaining wing may decrease from its base up to its free end.

Optionally, the retaining wing has a triangular shape.

Optionally, the width of the retaining wing at the free end thereof is less than or equal to $1/4$ of the width of the retaining wing at its base, optionally less than or equal to $1/10$ of the width of the retaining wing at its base Optionally, the width of the retaining wing at the free end thereof is less than or equal to $1/5$ of the length of the link section, optionally less than or equal to $1/15$ of the length of the link section.

Optionally, the width of the retaining wing at the base thereof is less than or equal to $1/3$ of the length of the link section.

Optionally, the free end of the retaining wing forms a tip.

Optionally, when viewed radially, the retaining edge of the retaining wing has a concave shape.

Optionally, when viewed radially, the edge of the retaining wing opposite to the retaining edge has a convex shape.

Optionally, the link section has a retaining wing on each of its two edges.

Optionally, the support lugs have an inner protrusion, configured to grip the bearing surface of a pipe inserted into the collar.

Optionally, the inner protrusion comprises a tab carried by the link section and bent radially inwardly relative to said section.

Optionally, the tab is cut out in the link section.

Optionally, the tab is directed in the direction away from the hook.

Optionally, the link section extends substantially axially.

Optionally, the support lug is formed in one piece with the annular part.

DETAILED DESCRIPTION

Figure 1:
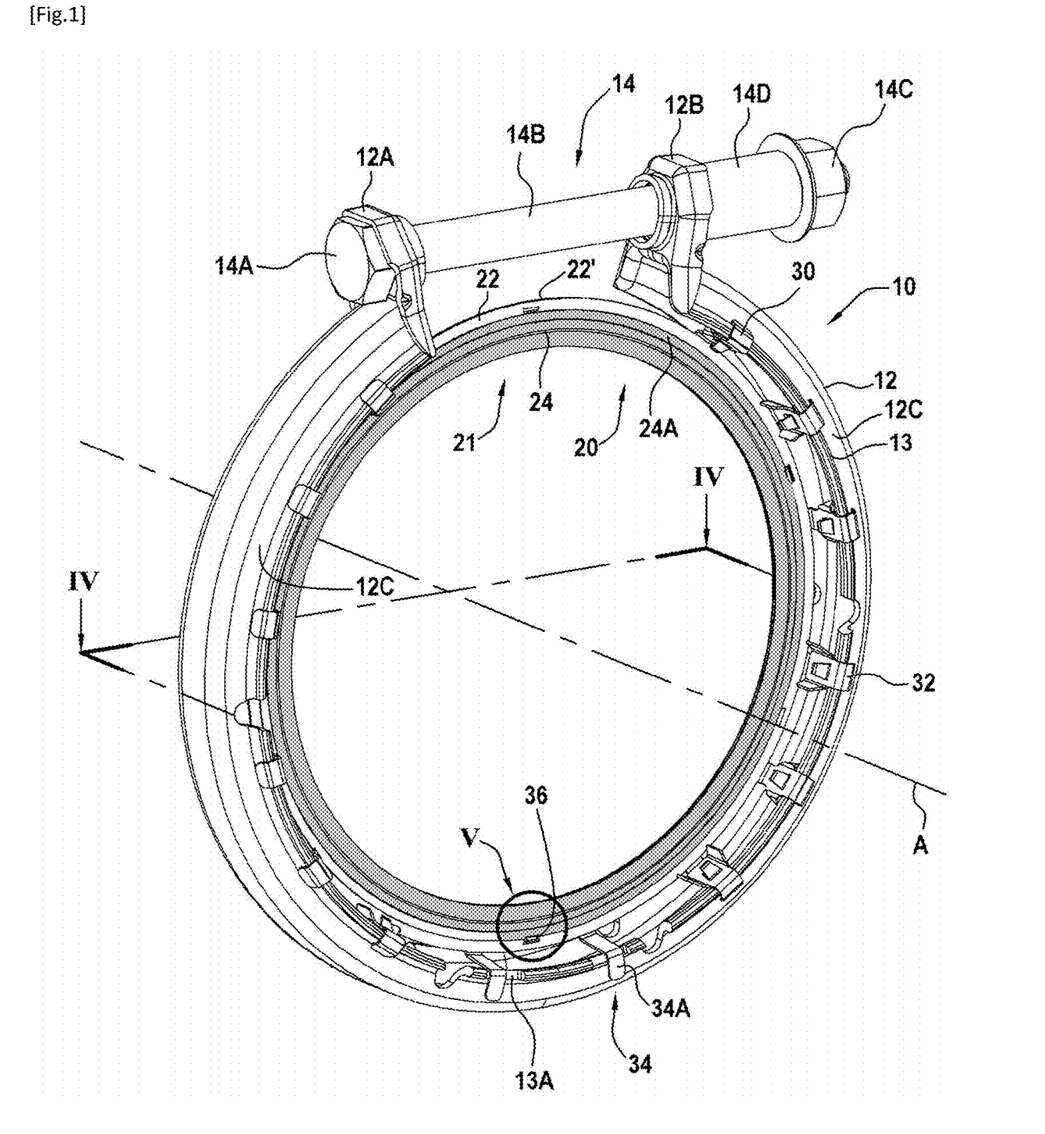
FIG. 1 is a perspective view of a clamping system according to the present disclosure taken from a first side.

FIG. 1 shows a clamping collar 10 comprising a belt 12 whose ends are raised radially so as to form clamping lugs respectively 12A and 12B. To clamp the collar, the diameter of the belt is reduced by cooperation of a clamping screw 14 with the clamping lugs 12A and 12B. The shank 14B of the screw passes through bores of the clamping lugs, its head 14A cooperating with the lug 12A and the opposite end being provided with a nut 14C cooperating with the lug 12B in this case via a spacer 14D.

Figure 4:
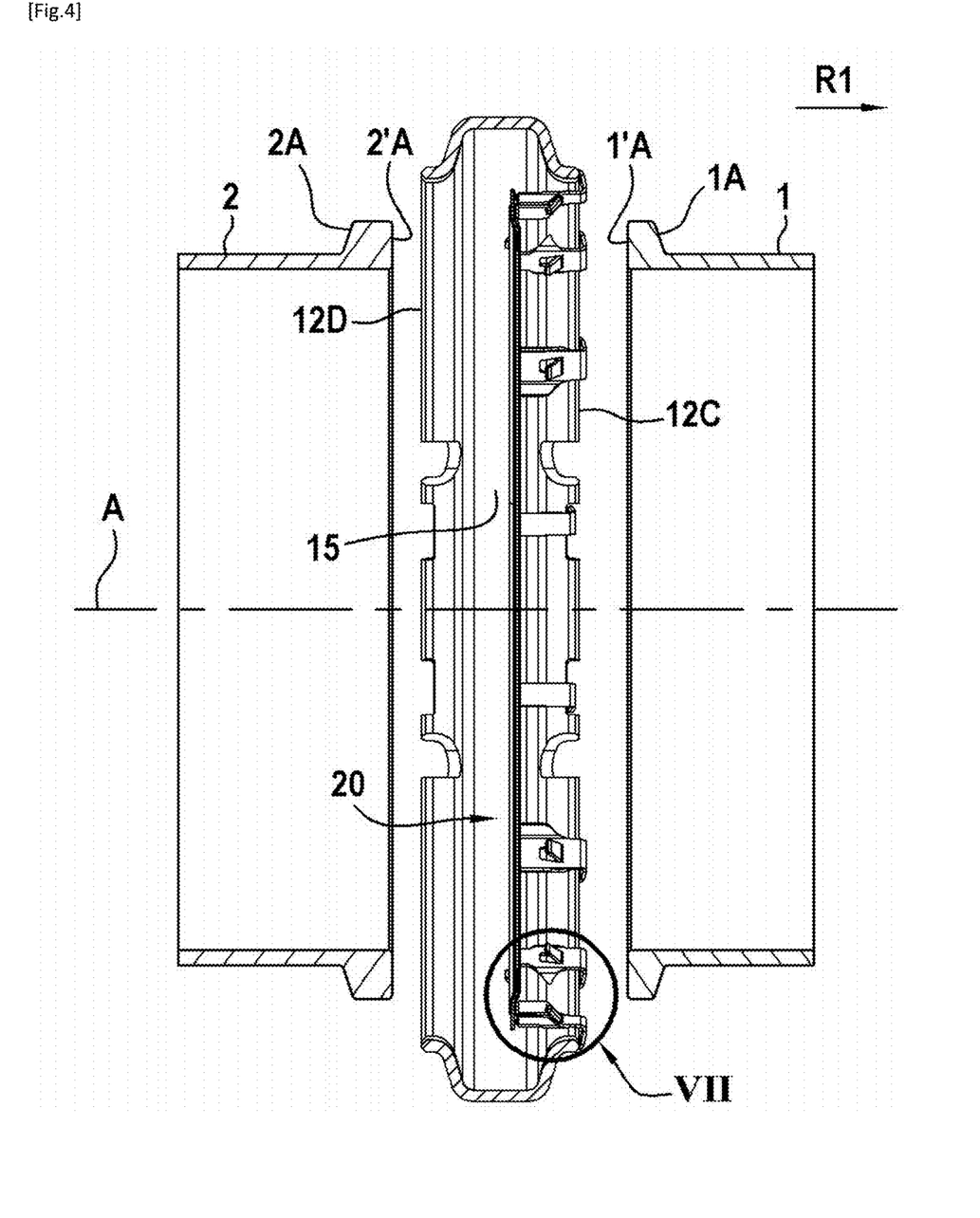
FIG. 4 is an axial sectional view in the plane IV of FIG. 1 showing, on the one hand, the clamping system according to the disclosure and, on the other hand, the ends of two pipes to be assembled using this clamping system.

The belt 12 has an inner recess 15 (better visible in FIG. 4) formed between two flanks, respectively 12C and 12D, of this belt. A washer 20, which in this case forms a seal, is disposed inside the belt. As best seen in FIG. 4, the clamping system is used to connect two pipes 1 and 2 whose ends are provided with bearing surfaces 1A and 2A. To connect the pipes, their ends are brought together until they are located axially in the recess 15, and the diameter of the belt is reduced so that the flanks 12C and 12D are clamped against the bearing surfaces 1A and 2A. In this case, the bearing surfaces 1A and 2A are formed on radial flanges present in the ends of the pipes 1 and 2.

Hereinafter, the washer 20 will be referenced to as seal, although this sealing function is only one example of a function for the washer. It can be primarily used to pre-mount the collar on one of the pipes. As indicated, the seal 20 is disposed inside the collar. For the connection of the pipes 1 and 2, the front surfaces 1'A and 2'A of the ends of the pipes 1A and 2A are placed on either side of an annular sealing part 21 present in the seal 20.

Within the meaning of the present disclosure, the forward direction, for the pipe 1 or 2, is the direction towards the other pipe 2 or 1 when their ends are brought together to assemble the pipes. Thus, the bearing surfaces 1A and 2A are formed on the rear faces of the radial flanges present in the ends of the pipes. The backward direction is obviously the opposite direction. For one element, the inward direction is the direction towards the axis A. The outward direction is opposite.

In this case, the annular sealing part comprises a metal washer 22 and a non-metal based washer 24 fixed to the metal washer. In this case, as will be understood by considering together FIGS. 1, 2 and 3, the annular sealing part comprises the metal washer 22, the non-metal based washer 24 disposed on a first face of the metal washer and another non-metal based washer 26 disposed on the other face of the metal washer. Thus, the metal washer is sandwiched between the non-metal based washers 22 and 24.

For example, the metal washer 22 can be manufactured from the same metal as the belt 12, for example stainless steel. The non-metal based washer(s) 24, 26 can be formed from a composite material, for example mica-based material.

Figure 2:
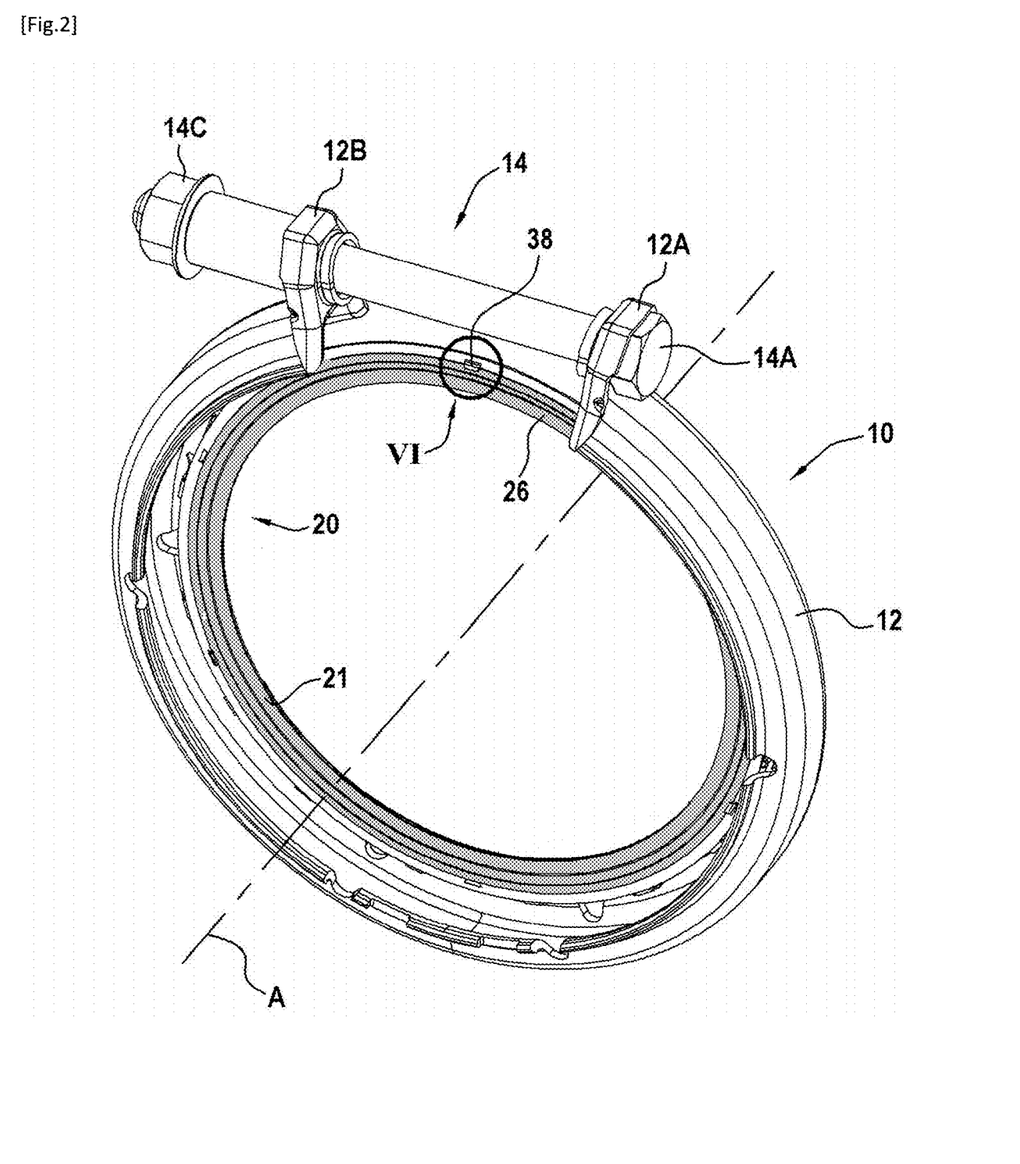
FIG. 2 is a perspective view of the system represented in FIG. 1, taken from the other side.
Figure 3:
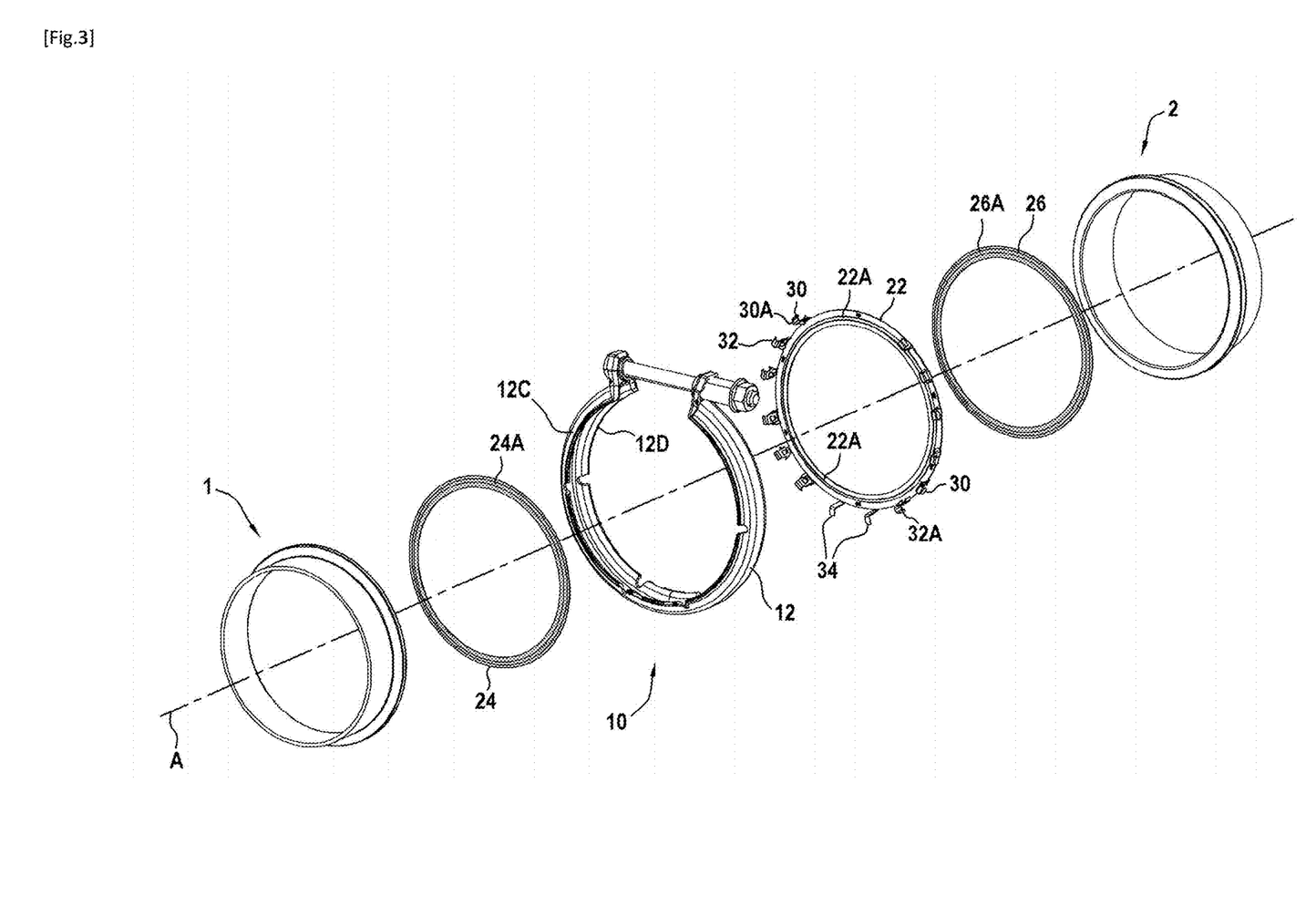
FIG. 3 is an exploded perspective view showing different elements constituting the clamping system represented separately, as well as the ends of two pipes to be assembled using this system.

The non-metal based washer(s) 24 and 26 is/are carried by the metal washer 22. As can be seen in FIGS. 1 to 3, this metal washer 22 carries support lugs through which the metal washer and the non-metal based washer are supported relative to the collar 10. The seal is thus pre-mounted in the belt, that is to say, before placing the collar on the pipes and clamping it, the seal is carried by the collar so that the collar and the seal can be handled as a whole.

Furthermore, the metal washer can also carry support lugs used for the pre-mounting of the collar equipped with the washer on one of the pipes to be assembled. Thus, the assembly formed by the collar and the seal can be disposed at the end of one of the pipes and remain in place at this end, before placing the end of the other pipe and clamping the collar. The same lugs can have the dual function of pre-mounting the seal in the belt and of pre-mounting the assembly formed by the collar and the seal at the end of one of the pipes. These support lugs are carried by the outer periphery (away from the axis A of the belt), of the metal washer 22.

Figure 7:
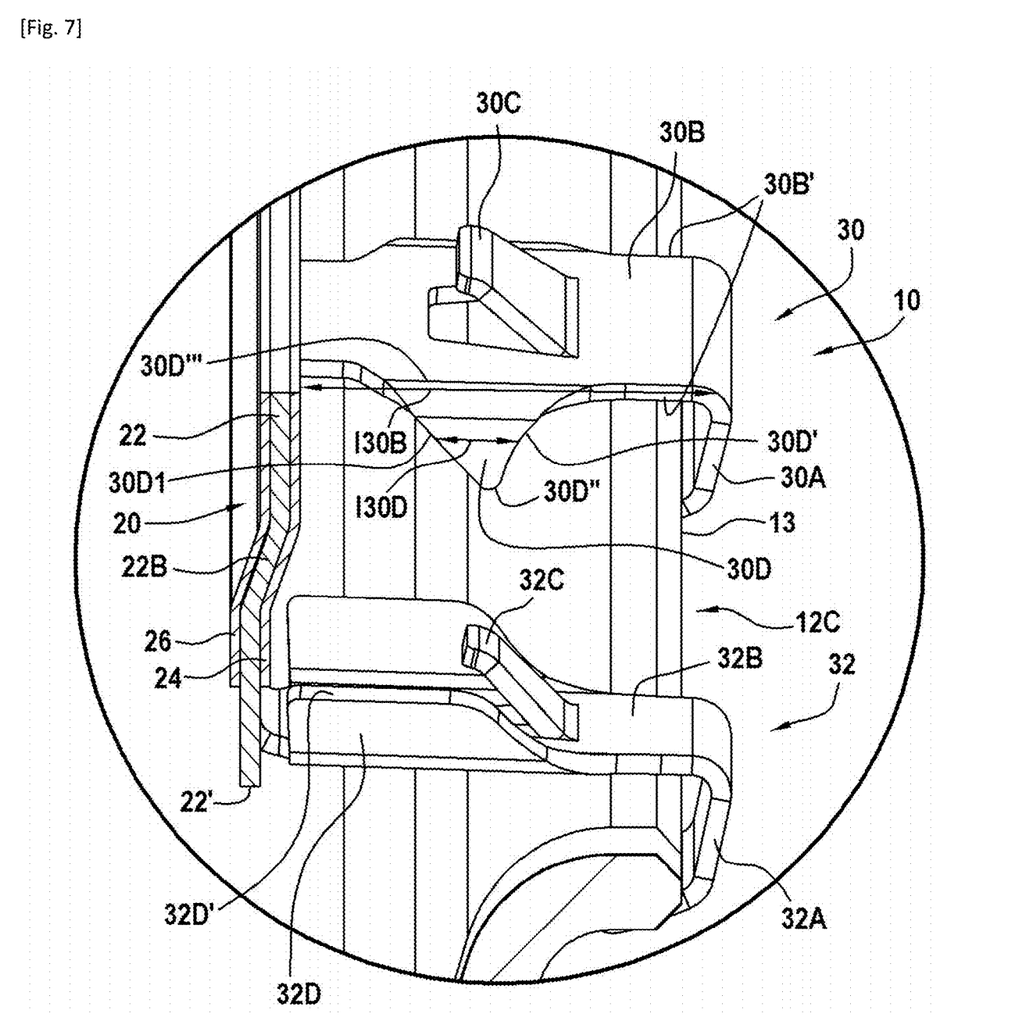
FIG. 7 is a view of detail VII of FIG. 4.
Figure 9:
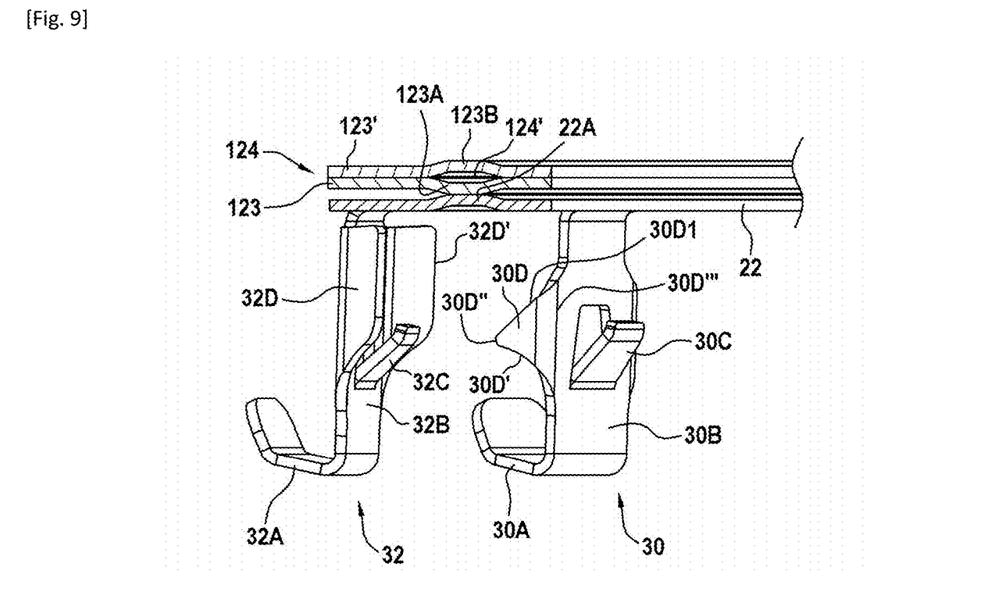
FIG. 9 is a partial perspective view showing one variant for the seal.

In this case, three types different of lugs have been represented. As best seen in FIGS. 7 and 9, the support lugs 30 have ends 30A curved as a hook so as to be able to hook on the edge 13 of the flank 12C of the belt 12. Between their region of connection to the outer periphery 22' of the metal washer 22 and this hook 30A, these lugs 30 have a link section 30B which in this case extends substantially axially, that is to say substantially parallel to the axis A. As better seen in FIG. 7, this link section 30B has a hooking tab 30C which is cut out in the link section 30B and bent radially inwardly while extending towards its free end, in the direction from the hook 30A to the outer periphery of the metal washer 22'. This tab 30C is used to grip the washer on the bearing surface 1A of the pipe 1 in order to retain the pre-mounted collar at the end of this pipe. It can be seen that the orientation of this tab 30C in the direction away from the hook 30A, prevents the pipe from being released from the washer in the backward direction for this pipe 1, along the arrow R1 indicated in FIG. 4. The tab 30C of a lug 30 is an example of an inner protrusion configured to grip the bearing surface 1A inserted into the collar.

Furthermore, the support lugs 30 have retaining wings 30D which, from the longitudinal edges of the link sections 30B, are bent radially outwardly, that is to say so as to move away from the axis A. Furthermore, these retaining wings 30D have a retaining edge 30D' directed towards the inner face of the hook 30A and therefore towards the inner face of the flank 12C of the belt 12 when the seal is pre-mounted in the washer. These retaining edges 30D' are spaced from the inner faces of the hooks 30A. The edge 13 of the flank 12C is housed in the space thus formed between the hook 30A and the retaining edge 30D. This allows holding the metal washer 22 relative to the belt of the collar by retaining it in both axial directions.

Although the figures show that the link section 30B has a retaining wing 30D on each of its two longitudinal edges 30B' (substantially parallel to the axis A), it could have only one retaining wing.

It can be seen from FIG. 7 that the retaining wing 30D has a width 130D, measured axially, which decreases towards its free end 30D". Thus, during the clamping of the collar, the retaining wing 30D has a tendency to naturally slide against the inner periphery of the flank 12C and to bend or crush without hindering the clamping.

It can be seen that the width of the retaining wing at its free end is very small, providing almost point contact against the inner periphery of the flank 12C in the unclamped state of the collar. The width of the retaining wing at its free end is less than or equal to ¼ of the width of the retaining wing at its base 30D''', this base being the part of the retaining wing through which it is attached to the link section 30B that carries it. The width of the retaining wing at its free end 30D" is even less than or equal to ¹⁄₁₀ of its width at its base 30D'''.

The width of the retaining wing 30D at its free end 30D" is less than or equal to ⅕ of the length l30B of the link section 30B, this length l30B being measured axially. The width of the retaining wing 30D at its free end 30D" is even less than or equal to ¹⁄₁₅ of the length l30B of the link section 30B.

The width of the retaining wing 30D at its base 30D''' is less than or equal to ⅓ of the length l30B of the link section 30B.

These dimensional characteristics and these geometric ratios allow obtaining an excellent compromise between the need to ensure that the retaining wing has good resistance to axial forces and the need to allow it to deform quite easily under the effect of radial forces inwardly, so as not to consume too much clamping force.

Generally, the free end 30D" of the retaining wing forms a tip, providing almost point bearing against the inner periphery of the flank 12C in the unclamped state of the collar.

Generally, the retaining wing has a triangular shape. In a way, it has the shape of a skate wing, which bends quite easily under a radial force, while being resistant to axial forces. The amount of material in which the retaining wing is made is minimized, which promotes its ability to deform under the clamping force, but the base of the retaining wing is wide enough, and the retaining wing is radially long enough for the retaining wing to perform its axial retention function and spacer function as long as the collar is not clamped.

When viewed radially as in FIG. 7, the retaining edge 30D' of the retaining wing 30D has a concave shape. This allows arc-to-arc pivotal movement between the retaining edge of the retaining wing and the edge of the flank of the belt, during clamping, when this edge is radiated so as to form a convex surface. This pivotal movement promotes the flap movement of the retaining wing during clamping.

Conversely, the edge 30D1 of the retaining wing 30D which is opposite to its retaining edge 30D" has a convex shape.

The support lug can be formed in one piece with the washer, in a strip. It is initially cut out and formed flat, before undergoing successive foldings. When flat, the retaining wing can form a triangle whose base is attached to the link section and whose side intended to form the retaining edge is practically perpendicular to the longitudinal direction of the link section, while the other side, intended to form the edge opposite to the retaining edge, is inclined by about 45° with respect to this longitudinal direction. When flat, the side of the retaining wing intended to form the retaining edge may be very slightly concave, for example having the shape of an arc of a circle with a large radius of curvature, which does not eliminate the overall triangular shape of the retaining wing.

The support lugs furthermore comprise lugs 32 which also have hooks 32A at their free ends opposite to their areas of attachment to the outer periphery 22' of the washer 22. These lugs 32 also comprise axial sections 32B which extend substantially axially between the attachment of these lugs to the washer 22 and the hooks 32A. These lugs 32 also have hooking tabs 32C similar to the tabs 30C described above. Finally, these lugs 32 also comprise centering wings 32D which are however oriented opposite the aforementioned retaining wings 30D. Indeed, the centering wings 32D are bent radially inwardly from the longitudinal edges of the axial sections 32B. These centering wings 32D have longitudinal edges 32D' which contribute to the pre-mounted retention of the collar on the end of the pipe 1 by retaining the washer relative to the pipe with respect to radial clearances. The longitudinal edges 32D' may have locally a tapered protrusion to promote their folding during clamping.

The metal washer also has lugs 34 which, as seen in FIGS. 1 and 3, have hooks 34A at their free ends opposite to the outer periphery 22' of the washer 22 and axial sections which extend from this washer up to these hooks. These lugs are used for the angular wedging of the washer relative to the belt, the hooks 34A being engaged in notches 13A present in the edge 13 of the flank 12C of the belt.

Generally, the support lugs 30 and the support lugs 32 are disposed alternately on the outer periphery of the washer 22. These lugs 30 and 32 are used for the hooking on the edge 13 of the flank 12C of the belt 12 by preventing the seal from moving relative to the belt in the direction opposite to the direction R1 indicated in FIG. 4. The retaining wings 30D are used to retain the washer relative to the belt by limiting its displacement in the direction R1 relative to on the belt. These lugs, as well as the lugs 32 also have the tabs 30C or 32C used to retain the end of the pipe inside the washer. The lugs 32 also have the centering wings 32D used to center the pipe relative to the washer.

As can be seen in particular in FIG. 3, the support lugs 30 and 32 are formed in one piece with the metal washer. Indeed, this metal washer is formed in one piece from a strip, by cutting, stamping and folding.

In the example represented in FIGS. 1 to 4, the metal washer 22 and the non-metal washers 24 and 26 are substantially planar. Indeed, the front faces 1'A and 2'A of the flanges on which are formed the bearing surfaces of the pipes 1 and 2 are oriented radially.

Figure 8:
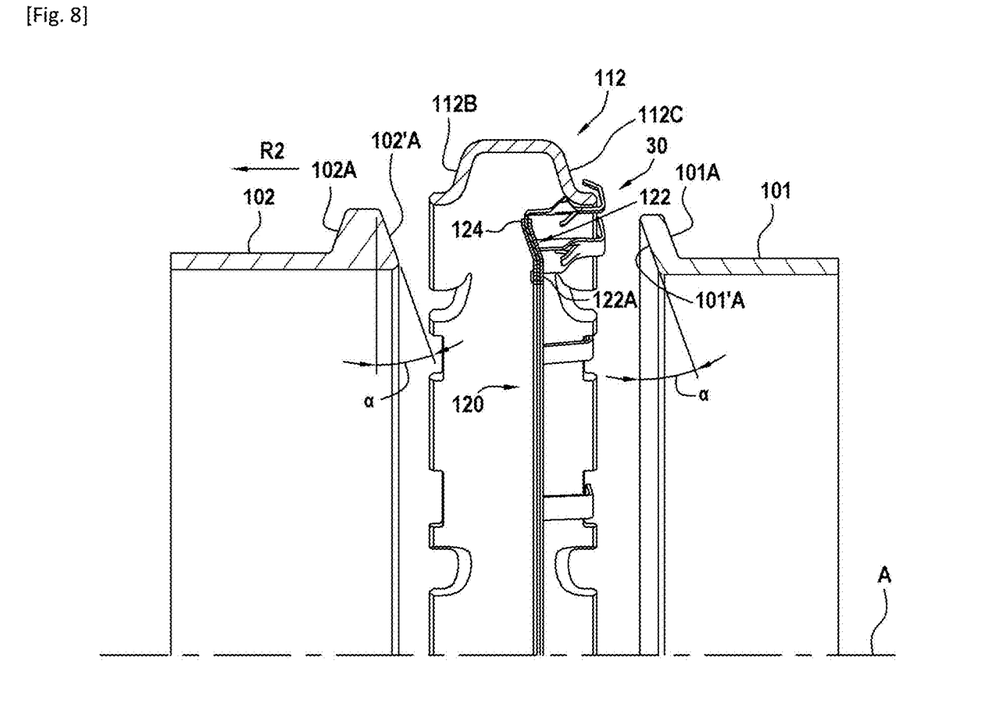
FIG. 8 is a partial axial sectional view taken like that of FIG. 4, for one variant.

However, as indicated for example in patents EP 1 451 498, EP 2 598 785 or EP 3 232 107, the collar can be pre-mounted on pipes whose bearing surfaces are frustoconical. In this case, as can be seen in FIG. 8, the metal washer 122 may have a frustoconical surface, particularly a stamped frustoconical surface. The cross-section of FIG. 8 shows the seal 120 with the washer 122 and lugs 30, 32 and 34, similar to the lugs previously described. This belt 112 is similar to the belt 12, except that its flanks 112C and 112B can be inclined like the branches of a V, adapted to the flare shape of the pipes 101 and 102. Indeed, the bearing surface 101A of the pipe 101 has a frustoconical shape forming a flare shape, and the bearing surface 102A of the pipe 102 has a front face 102'A, which also forms a frustoconical surface so as to be adapted to the aforementioned flare shape. The bearing surface 102A formed at the rear in the direction R2 relative to the frustoconical portion 102'A, is also frustoconical in the opposite direction, substantially parallel to the flank 112B of the belt 112. As indicated, the metal washer has a stamped frustoconical surface 122A, adapted to the shapes of the surfaces 101'A and 102'A of the pipes whose connection must be sealed using the seal 120. The non-metal based washer 124 is for its part formed in a planar ring which is deformed to match the frustoconical shape of the frustoconical surface of the metal washer 122.

The angle α formed by the aforementioned frustoconical surfaces of the pipes relative to the direction perpendicular to the axis A is for example on the order of maximum 20 degrees for an initially planar non-metal based washer. It is however possible to have a greater angle α, for example on the order of 45°, using a non-metal based washer which is not initially planar, but which is shaped accordingly, for example by heating, particularly in the case of a washer comprising a thermoformable binder.

Figure 5:
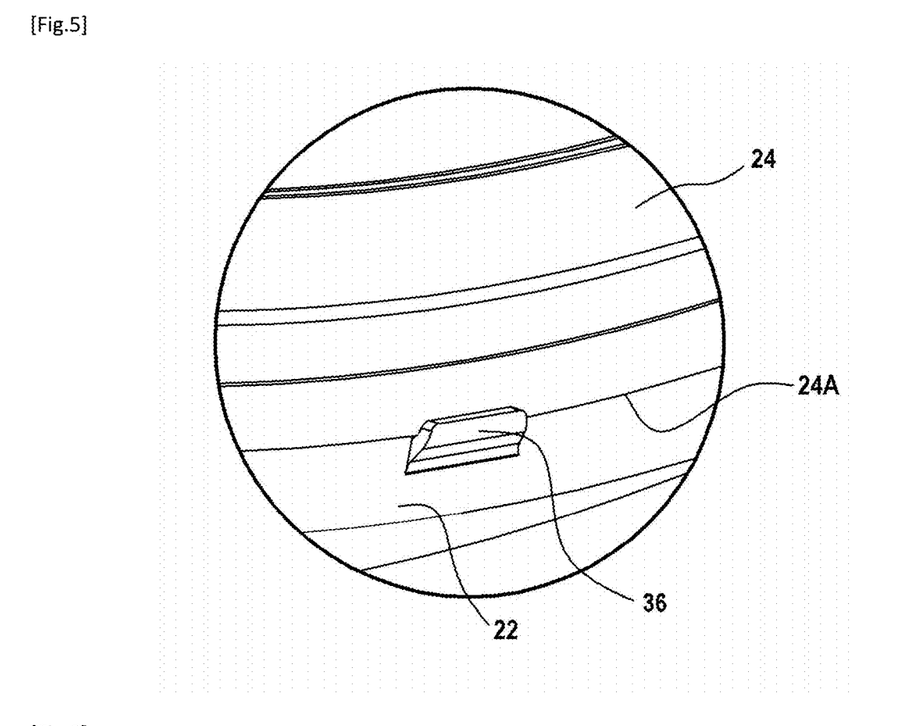
FIG. 5 is an enlarged view of detail V of FIG. 1.
Figure 6:
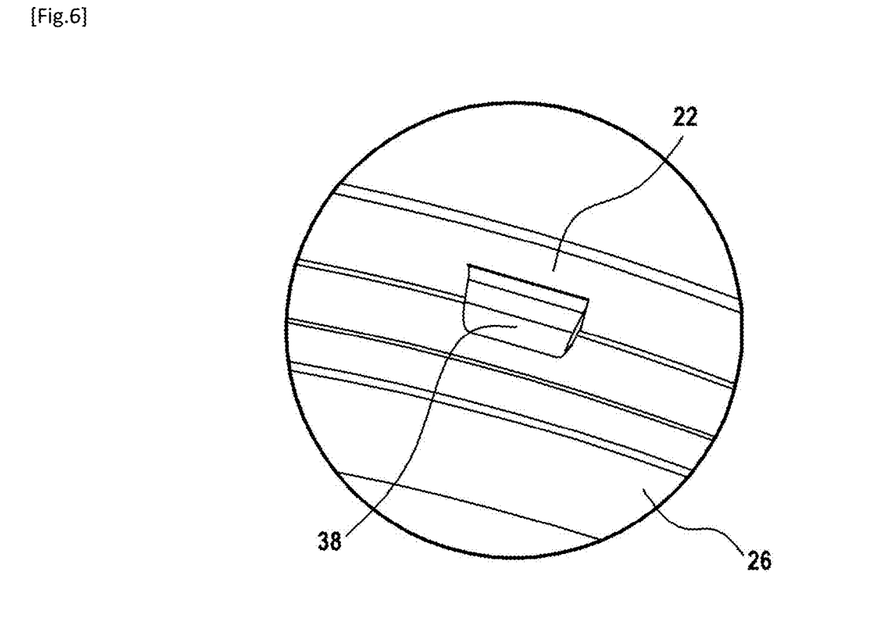
FIG. 6 is an enlarged view of detail VI of FIG. 2.

The non-metal based washer 24, unlike the metal washer 22, may be purely annular, by being devoid of fixing lugs or the like. The non-metal based washer is carried by the metal washer 22. It can be fixed thereto in different ways. For example, it can be fixed to the metal washer by bonding. The non-metal based washer 24 can be supported by the metal washer 22 by purely mechanical means not requiring an external material such as glue. Thus, the metal washer may carry retaining lugs which cooperate with the non-metal based washer to retain it relative to the metal washer. Thus, in FIGS. 1 and 5, it can be seen that the metal washer 22 has lugs 36 which are formed by cutouts in this washer which are slightly straightened axially to form tabs whose free ends are oriented towards the axis A. These retaining lugs 36 are thus used to wedge and retain the non-metal based washer 24 by cooperating with its outer radial edge 24A. Likewise, as seen in FIGS. 2 and 6, the metal washer 22 has retaining lugs 38 which are similar to the retaining lugs 36 but oriented on the other side axially to retain the non-metal based washer 26 located on the other face of the washer 22.

The metal washer 22 may have an annular bulge or, in general, an annular relief giving it an axial deformation capacity. For example, in FIG. 3, it can be seen that the washer 22 has an annular bead 22A protruding on one of its faces, against which the non-metal based washer 24 is disposed. The non-metal based washer 24 or 26 may be planar or have an annular bulge 24A. The washer 26 may for its part have an annular bulge 26A.

FIG. 9 shows an example in which the non-metal based washer 124 is in fact formed of two elementary washers, respectively 123 and 123' fixed together, for example by bonding. Each of these elementary washers 123 and 123' has an annular bulge, respectively 123A and 123B. Thus, the washer 124 has an annular bulge not only on its first face turned towards the metal washer 22, but also on the second opposite face. The annular bulges 123A and 123B are disposed on the same diametrical dimensions so as to form an annular space 124' therebetween. It can also be seen in FIG. 9 that the metal washer 22 has an annular bulge 22A protruding on its first face against which the washer 124 is disposed, so that the annular bulges 22A and 123A are disposed one against the other.

Instead of a purely convex annular bulge, the metal washer 22 may have a wave or a deformation forming a slight fold 22B (see FIG. 7)

In the examples which have just been described, the washer 20 comprises a metal part 22 and a non-metal part 24 or 124. However, the washer can be monocomponent and, for example, only formed of the metal part 22.

Attention is now turned to the support lugs 30 and their retaining wings 30D. These lugs and these wings are used for the hooking on a flank of the belt, by performing a function of axial retention of the washer by retaining the washer relative to the belt in both axial directions, and a spacer function by forming between the annular part of the washer and the inner face of this flank of the belt, an annular space into which the end of a pipe can be inserted in order to pre-mount the clamping system on this pipe.

By performing these two functions on the same support lug, their efficiency is optimized. It is indeed possible to choose the number and the angular distribution of the support lugs as a function of the desired axial resistance. It is possible to have more support lugs than in EP 1 451 498 since it is not necessary to reserve locations for inner lugs used only for the retention of the washer with respect to a displacement in the direction R1 relative to the collar.

With their inner protrusions (tabs) 30C, these support lugs 30 also perform a function of axial retention of the pipe in the collar.

As indicated, the washer can further carry lugs 32 which are also used for the hooking on the belt. These lugs 32 are also used for the centering of the clamping system on the pipe, thanks to the centering wings 32D.

Figure 10:
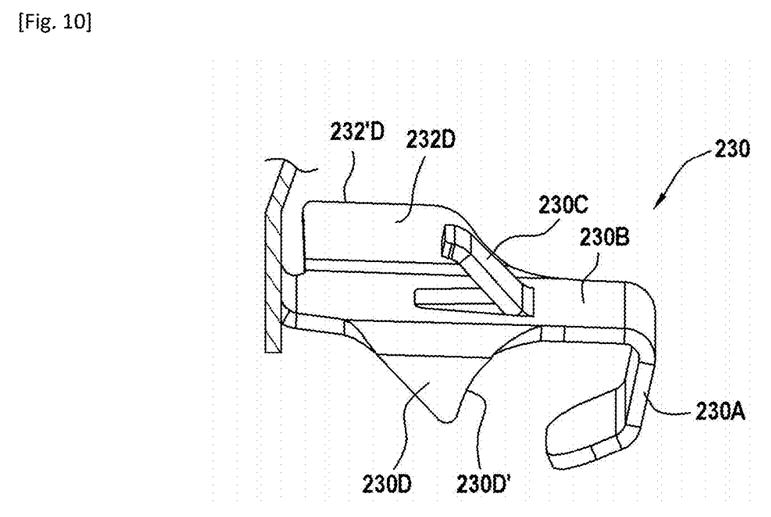
FIG. 10 shows one variant of a support lug.

A same lug may have both a retaining wing folded outwardly of the type of the retaining wing 30D and a centering wing folded inwardly of the type of the centering wing 32D. This lug then combines the aforementioned function of axial retention of the washer and the spacer function. If it is further provided with an inner protrusion of the type of the tabs 30C, it further ensures the function of axial retention of the pipe. For example, such a multifunction lug 230 is represented in FIG. 10. It has a hook 230A, a link section 230B, a tab 230C and a retaining wing 230D similar to those of the support lugs 30, and a centering wing 232D similar to that of the lugs 32. It can be seen for example that the retaining wing 230D may have a retaining edge 230'D similar to the retaining edge 30'D and that the centering wing 232D has a longitudinal centering edge similar to the edge 32D. In this case, the retaining wing 230D and the centering wing 232D are formed on the two opposite edges of the link section. This retaining wing 230D has the same geometric characteristics and the same dimensional ratios as the retaining wing 30D previously described.

The lugs 30 and 32, or the lugs 230, can have the same length, which simplifies the manufacture. If they are present, the angular wedging lugs 34 of the washer may also have the same length.

The invention claimed is:
1. A clamping system for connecting a first and a second pipe whose facing ends have bearing surfaces protruding relative to the cylindrical external surface of said pipes, the system comprising a collar that can be clamped and a washer, the collar comprising a belt able to cooperate with said bearing surfaces by an internal periphery of said belt delimiting a recess into which the bearing surfaces can be inserted, the washer comprising an annular part disposed inside the belt and carrying support lugs which comprise a hook configured to hook on an edge of the belt and a link section which extends between the annular part and the hook, the link section carrying at least one retaining wing which is bent radially outwardly and which has a retaining edge spaced from the hook, the retaining wing having a width, measured axially, which decreases towards its free end, the edge of the belt being housed in a space formed between the retaining edge and the hook.

2. The clamping system according to claim 1, wherein the retaining wing has a triangular shape.

3. The clamping system according to claim 1, wherein a width of the retaining wing at a free end thereof is less than or equal to ¼ of a width of the retaining wing at a base thereof.

4. The clamping system according to claim 1, wherein a width of the retaining wing at a free end thereof is less than or equal to ¹⁄₁₀ of a width of the retaining wing at a base thereof.

5. The clamping system according to claim 1, wherein a width of the retaining wing at a free end thereof is less than or equal to ⅕ of a length of the link section.

6. The clamping system according to claim 1, wherein a width of the retaining wing at a free end thereof is less than or equal to ¹⁄₁₅ of a length of the link section.

7. The clamping system according to claim 1, wherein a width of the retaining wing at a base thereof is less than or equal to ⅓ of a length of the link section.

8. The clamping system according to claim 1, wherein a free end of the retaining wing forms a tip.

9. The clamping system according to claim 1, wherein, when viewed radially, the retaining edge of the retaining wing has a concave shape.

10. The clamping system according to claim 1, wherein, when viewed radially, an edge of the retaining wing opposite to the retaining edge has a convex shape.

11. The clamping system according to claim 1, wherein the link section has a retaining wing on each of two edges of said link section.

12. The clamping system according to claim 1, wherein the support lugs have an inner protrusion, configured to grip the bearing surface of a pipe inserted into the collar.

13. The clamping system according to claim 12, wherein the inner protrusion comprises a tab carried by the link section and bent radially inwardly relative to said link section.

14. The clamping system according to claim 1, wherein the link section extends substantially axially.

15. The clamping system according to claim 1, wherein the support lug is formed in one piece with the annular part.

16. The clamping system according to claim 1, wherein at least one of the support lugs has a centering wing bent radially inwardly and having a longitudinal edge.

* * * * *